United States Patent [19]

Park

[11] Patent Number: 5,822,984

[45] Date of Patent: Oct. 20, 1998

[54] ALTERNATE VALVE ASSEMBLY FOR SMOKE RE-COMBUSTION DEVICE

[76] Inventor: Sang Kyu Park, Clover Apt. 120-1003, Dunsan-dong, Seo-ke, Taejon, Rep. of Korea

[21] Appl. No.: 794,811

[22] Filed: Feb. 4, 1997

[30] Foreign Application Priority Data

Feb. 6, 1996 [KR] Rep. of Korea .......................... 96-2771

[51] Int. Cl.⁶ .................................. F01N 3/00; F16K 1/16
[52] U.S. Cl. ........................... 60/288; 60/311; 137/527.8; 137/315; 251/298; 251/303; 251/308
[58] Field of Search .................. 60/311, 288; 137/527.8, 137/527, 315; 251/303, 308, 298

[56] References Cited

U.S. PATENT DOCUMENTS

| | | | |
|---|---|---|---|
| 3,268,202 | 8/1966 | Murray et al. | 251/303 |
| 3,938,541 | 2/1976 | Polacheck et al. | 251/298 X |
| 4,067,095 | 1/1978 | Cameron | 137/315 X |
| 4,071,221 | 1/1978 | Di Sciascio et al. | 251/298 X |
| 4,167,852 | 9/1979 | Ludecke | 60/296 |
| 4,319,896 | 3/1982 | Sweeney | 55/213 |
| 4,353,390 | 10/1982 | Karpenko | 137/527.8 |
| 4,878,928 | 11/1989 | Wagner et al. | 55/466 |
| 5,024,054 | 6/1991 | Barris et al. | 60/288 X |
| 5,113,652 | 5/1992 | Baines et al. | 60/288 |
| 5,156,374 | 10/1992 | Fort et al. | 251/303 |
| 5,634,333 | 6/1997 | Tanaka et al. | 60/288 |
| 5,661,975 | 9/1997 | Abel et al. | 60/288 |

*Primary Examiner*—Ira S. Lazarus
*Assistant Examiner*—Nhat-Hang H. Lam
*Attorney, Agent, or Firm*—Snell & Wilmer

[57] ABSTRACT

An alternate valve assembly for a smoke re-combustion device of a engine includes a pair of alternate valves which are symmetrically installed at each inlet of filters connected with branches of an exhaust manifold. Each of the valves comprises a valve body which is supported to be rotatable by a shaft having a rectangular part and a protruded end, in bearings of a valve housing, with bushes interposed, an arm connecting the valve body with the shaft, an actuator being placed in the outside of the valve housing and being connected with the protruded end through a link, a collar being inserted in the periphery of the shaft, rings for maintaining airtightness being inserted in peripheries of the shaft and the protruded end and being pressed elastically by springs toward the inner ends of the bushes, a pair of retainer rings being inserted in the inside of the bearing which supports the protruded end, a packing being positioned between the retainer rings, a ring-shaped valve seat being inserted in and being supported by an annular groove having a jaw which is formed in the inner periphery of the inlet of the valve housing, and a cushion being fixed to the outside of the ring-shaped valve seat.

4 Claims, 6 Drawing Sheets

ALTERNATE VALVE ASSEMBLY FOR SMOKE RE-COMBUSTION DEVICE

BACKGROUND OF THE INVENTION

1. Field of the Invention

This invention relates to an alternate valve assembly for a smoke re-combustion device, more particularly to an alternate valve assembly comprising a pair of valves which are symmetrically installed at each inlet of filters connected with branches of an exhaust manifold and which are opened and closed alternately, for a smoke re-combustion device which can be applied to a combustion device of a engine using light oil or heavy oil as fuel.

2. Description of the Prior Art

It is common knowledge that light oil or heavy oil generates much smoke because it has higher firing point than inflammation point, and so it is incompletely burned. Such a smoke generation is extreme in vehicles powered by diesel engines and its exhaust gases include smoke particles containing carbon monoxide(CO), hydro-carbon(HC), carbon, etc. Because the smoke particles act as a major cause for smog pollution, it is necessary to reduce the smoke, if possible.

As an example of technique to remove the smoke particles from the exhaust gases of a diesel engine, a re-combustion method and an oxidation promotion method using oxidative catalyst have been known. The former is a method to re-burn the smoke components which are collected in a muffler connected with an exhaust manifold of the engine, by a burner. The latter is a method to oxidize the smoke components which are included in the exhaust gases, by oxidative catalyst.

The former method is practically applied to some diesel engines, however, it is disadvantageous in that fuel is excessively consumed because the smoke components are burned by a burner additionally equipped in the muffler and in that it is difficult to control the re-combustion time in case that goods are unduly loaded in the vehicle.

Also, the latter method is disadvantageous in that the efficiency of smoke removal is low although the consumption of fuel can be reduced and the control is easy.

Examples of the re-combustion method may be seen in U.S. Pat. No. 4,167,852 issued to Otto et al on Sep. 18, 1979, U.S. Pat. No. 4,319,896 issued to William et al on Mar. 16,1982 and U.S. Pat. No. 4,878,928 issued to Wayner et al on Nov. 7, 1989.

In addition, there is an improved device to burn the filtered smoke components by an electric heating, wherein the end of an exhaust manifold is branched off two ways and each branch includes a filter having an electric heater. In the device, the alternate valve assembly includes a pair of valves which are opened and closed alternately and each of the valves is set up in each inlet of the filters connected with the branches in order to filtrate and to re-burn alternately the smoke components of the exhaust gases which are discharged through the exhaust manifold.

To said smoke re-combustion device, a transformed butterfly valve or a gate valve is applied as the alternate valve. But, because the valve does not endure the inferior condition of the exhaust manifold which is influenced by a circumstance of high temperature over 200 ° C. with airtightness held up, the life span of the valve is reduced.

To be concrete, because a seal member to prevent a leakage of exhaust gases from the valve is prepared of rubber or silicone compound, it is impossible for the seal member to hold the proper form in the inferior circumstance, whereby the leakage of exhaust gases occurs before long; so that the alternate opening and closing of the valve and the control of re-combustion time are not achieved perfectly. Also, carbon and so on are infiltrated into and adhered to the gap between a shaft and a bearing which support the valve rotatably, so that the operation of the valve becomes impossible in the near future.

SUMMARY OF THE INVENTION

An object of the present invention is to provide an alternate valve assembly for the smoke re-combustion device, which is able to hold up perfect airtightness in the circumstance of high temperature, and that carbon and so on cannot be infiltrated into the gap between a shaft and a bearing, in order to solve various problems which are shown in the above prior smoke re-combustion device using a transformed butterfly valve or a gate valve.

In order to achieve the above object, the present invention provides an alternate valve assembly for a smoke re-combustion device of a engine including a pair of alternate valves which are symmetrically installed at each inlet of filters connected with branches of an exhaust manifold. Each of the valves comprises: a valve body being supported to be rotatable by a shaft in bearings of a valve housing with bushes interposed, the shaft including a rectangular part and a protruded end, the bushes being supported in the bearings of the valve housing; an arm connecting the valve body with the shaft; an actuator being placed in the outside of the valve housing and being connected with the protruded end through a link; a collar being inserted in the periphery of the shaft; rings for maintaining airtightness being inserted in peripheries of the shaft and the protruded end and being pressed elastically by springs toward the inner ends of the bushes; a pair of retainer rings being inserted in the inside of the bearing which supports the protruded end; a packing being positioned between the retainer rings; a ring-shaped valve seat being inserted in and being supported by an annular groove having a jaw which is formed in the inner periphery of the inlet of the valve housing; and a cushion being fixed to the outside of the ring-shaped valve seat.

The bearing of the part where the arm with which the valve body is connected is inserted and supported, may take the form of a polygon shape.

A jam plate may be added to the protruded end of the shaft so that a clamping nut for connecting the link with the protruded end will not be loosed from the protruded end.

The valve body may have a pin bearing part and a clamping bolt in the one side of the valve body. The pin bearing part supports both ends of a pin which pierce a pin hole formed in the arm. The arm is fixed to the clamping bolt by interposing a semi sphere-shaped fluted washer and a washer having a semi sphere-shaped protrusion part around the clamping bolt, by inserting the clamping bolt into a through hole which is formed in the lower end of the arm, and then by clamping a nut.

DESCRIPTION OF THE DRAWINGS

The invention will be described in greater detail with reference to the drawings, in which.

DETAILED DESCRIPTION OF THE INVENTION

Figure 1:
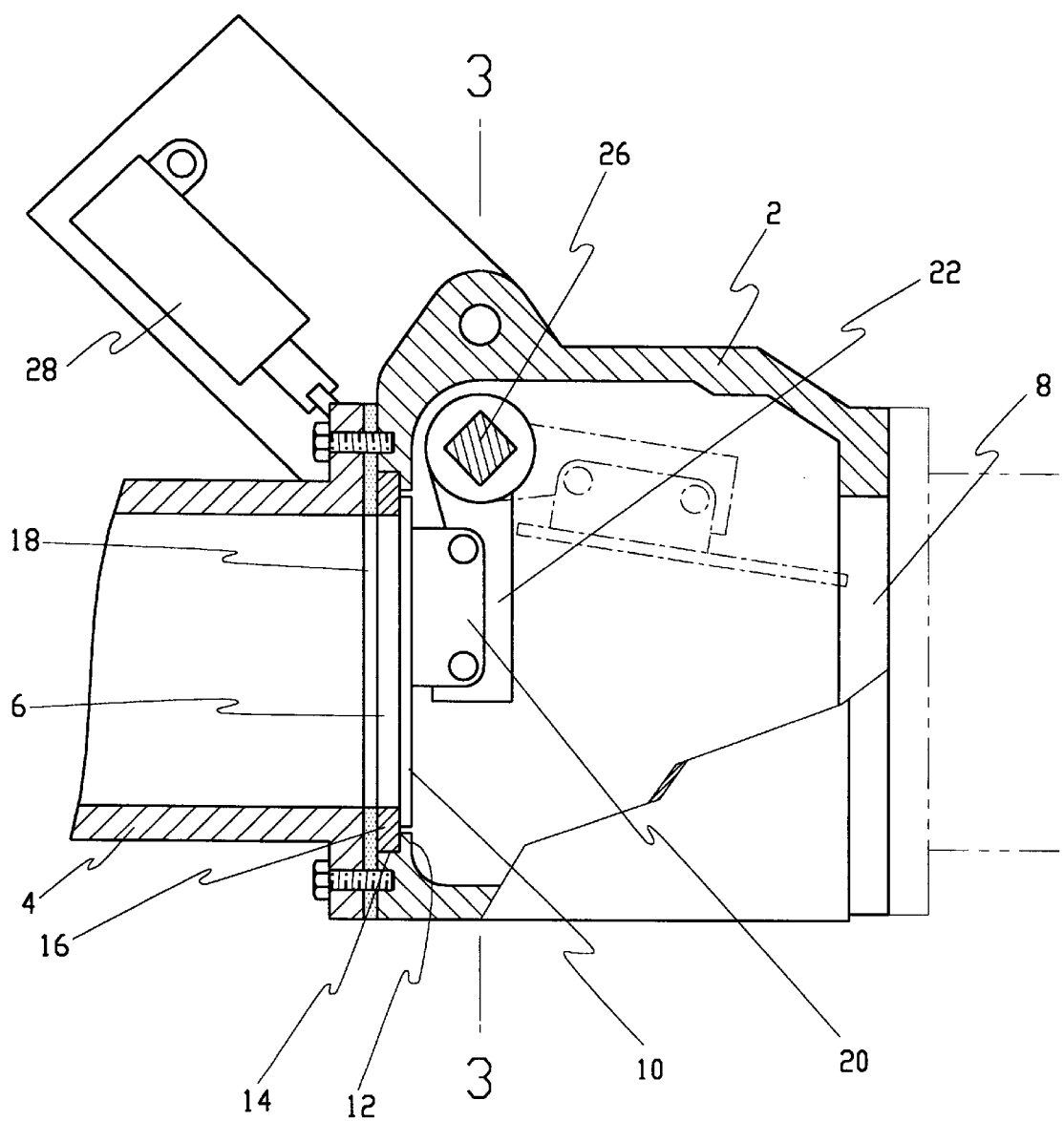
FIG. 1 shows a preferred embodiment of a valve used in an alternate valve assembly according to the present invention.

FIG. 1 illustrates a preferred embodiment of a valve used in an alternate valve assembly of the present invention;

A valve housing 2 has an inlet 6 which is connected with an exhaust manifold 4 and an outlet 8 which is opened in the opposite side of the inlet 6. Said inlet 6 of the valve housing 2 is opened and closed by a valve body 10 and an annular groove 14 with a jaw 12 is formed in the inner periphery of the inlet 6 and a ring-shaped valve seat 16 is fitted in the inside of the annular groove 14, whereby the valve body 10 closes the inlet 6 airtightly. The valve body 10 and the valve seat 16 are made of stainless steel and their contact surfaces have a mirror face formed by a lapping processing.

Because said ring-shaped valve seat 16 is supported elastically by a cushion 18 which is disposed in the outside of the valve seat 16, namely between the valve housing 2 and the exhaust manifold 4, it can maintain a close contact state with the valve body 10 even if a thermal deformation is generated in the valve seat 16. Also, the cushion 18 has an additional function to prevent exhaust gases from being leaked through the periphery of the ring-shaped valve seat 16.

The valve body 10 is connected to one end of an arm. The other end of the arm is inserted around and fixed by a rectangular shaft which is formed about the middle of a shaft, as discussed below. The arm is moved in association with an actuator 28 which is installed in the outside of the valve housing 2, whereby the valve body 10 is opened or closed between two positions marked with a full line and a dotted line. As an example of the actuator 28, a reversible motor or a hydraulic cylinder can be used.

Figure 2:
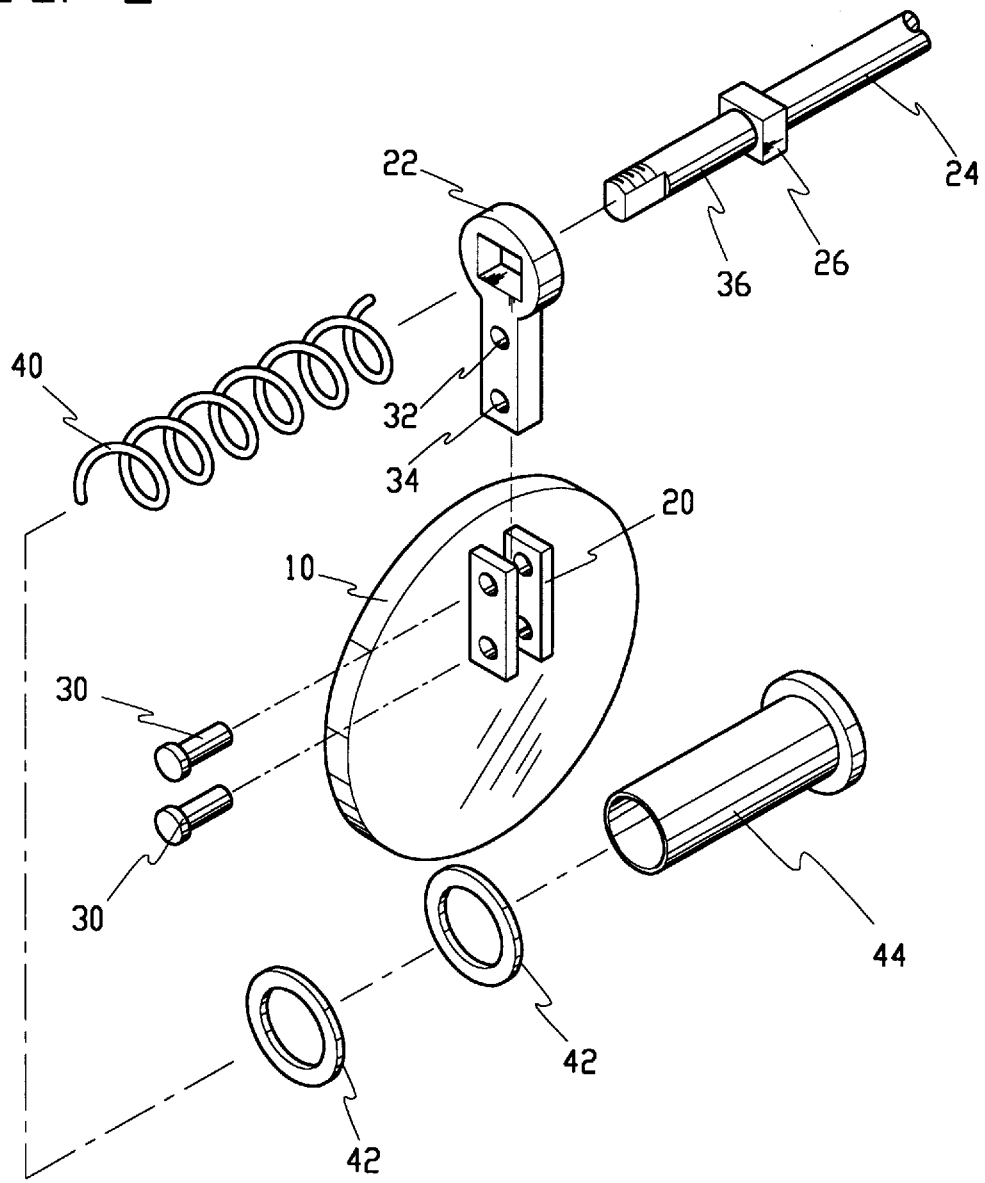
FIG. 2 is an exploded perspective view of the valve of FIG. 1.

FIG. 2 is an exploded perspective view of the valve of FIG. 1. The disk-shaped valve body 10 is connected with the arm 22 by at least a pair of pins 30 which pierce two pin bearing parts 20 formed in the back of the valve body 10. For the sake of it, a pair of pin holes 32 and 34 are formed in the arm 22.

The upper pin hole 32 is made to have a large allowance differently from the lower pin hole 34, so that the valve body 10 is airtightly contacted with the valve seat 16 for its all contact surface when the valve body 10 is located in the position to close the valve seat 16. That is, the pin 30 inserted in the upper pin hole 32 is positioned somewhat slantly against the pin 30 inserted in the lower pin hole 34 when the valve body 10 is closed because the lower pin hole 34 of the arm 22 is located in the center of the valve body 10; therefore a considerable allowance is given to said upper pin hole 32 and the pin 30 which is inserted in the upper pin hole 32 can be moved freely to some degree. Due to such structure, the valve body 10 is uniformly and tightly contacted with the valve seat 16 for all the contact surfaces of the valve body 10.

The arm 22 which opens and closes the valve body 10 to the valve seat 16, is connected with the shaft 24 by inserting it around the rectangular shaft 26 of the shaft 24. The shaft 24 includes a protruded end 36 which is formed extendedly from the rectangular shaft 26.

Figure 3:
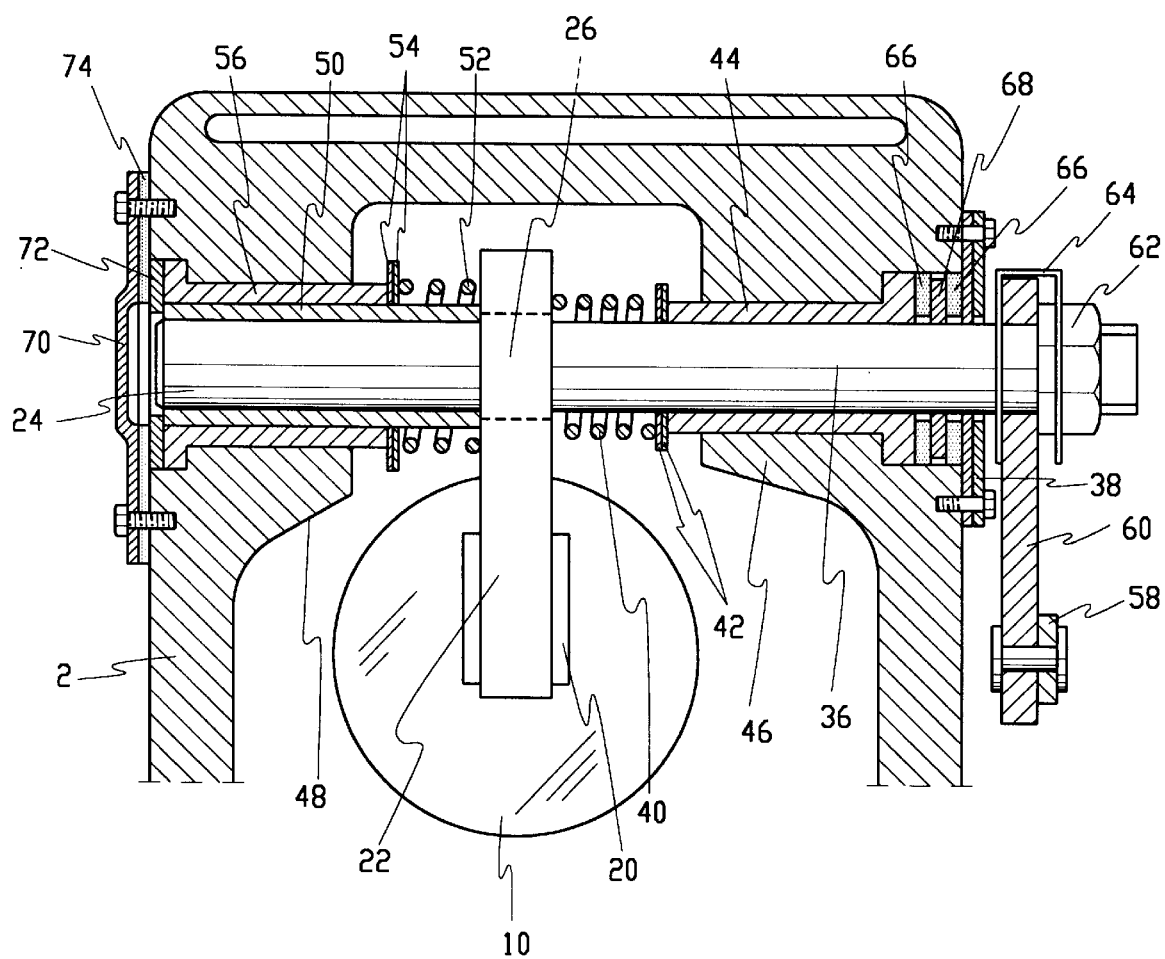
FIG. 3 is a cross-sectional view at line A—A of the valve of FIG.

FIG. 3 is a cross-sectional view at line A—A of the valve of FIG. 1, which shows the bearing structure of the valve housing 2. The tip of said protruded end 36 is arranged to be exposed to the outside of the valve housing 2 and the periphery of the tip is coated with and sealed up by a cover 38. Also, a spring 40, a pair of rings 42 for airtightness and a bush 44 are inserted around said protruded end 36, in turn. The shaft 24 and the protruded end 36 are supported by bearings 46 and 48 which are installed in the inside of said valve housing 2.

The shaft 24 additionally includes a collar 50 around it and the other structures are similar to those of the protruded end 36. That is, a spring 52, a pair of rings 54 for airtightness and a bush 56 are inserted around the shaft 24, in turn.

Both the springs 40 and 52 elastically press the corresponding rings 42 and 54, so that the rings close the gaps formed between the protruded end 36 and the bush 44 and between the collar 50 and the bush 56, thereby maintaining airtightness.

The tip of said protruded end 36 is fixed to a following member 60 or a link which is connected with a driving member 58 of said actuator 28, by a nut 62. The nut 62 can include a jam plate 64 for preventing the relaxation of the nut 62. The jam plate 64 is made of a steel plate which is folded with an U-shape and a polygonal groove is formed in one side of the jam plate 64 in order to restrict the rotation of the nut 62. Also, the jam plate 64 is inserted around the protruded end 36 so that the jam plate 64 can not be rotated. For this reason, it is preferred that the screw part of the protruded end 36 to which the nut 62 is tightened is made in the form of an ellipsoid by cutting off both opposite parts of the periphery of the screw part. Of course, the corresponding part(i.e., hole) of the jam plate 64 in which the screw part is inserted, is formed with an ellipsoid corresponding to the screw part, too.

Then, a pair of retainer rings 66 and a packing 68 which is positioned between the retainer rings 66 are inserted around the protruded end 36 and they are installed in the inside of the bearings 46. Said retainer rings 66 are loosely inserted around the protruded end 36 by setting up the inner diameter of the retainer rings 66 larger than the diameter of the protruded end 36 while the packing 68 is tightly inserted around the protruded end 36 that it may be rotated along with the protruded end 36. Therefore, when the packing 68 is rotated together with the protruded end 36, the retainer rings 66 open a path for the packing 68 so that the packing 68 may be rotated smoothly, whereby the exhaust gases can not be leaked through the periphery of the protruded end 36.

The outer end of the bearing 48 which supports the shaft 24 is covered with a cover plate 70. At the tip of shaft 24 which is closed by the cover plate 70, a slip washer 72 and a packing 74 are arranged between the valve housing 2 and the cover plate 70, whereby the is leakage of exhaust gases through such part is perfectly prevented.

Figure 4:
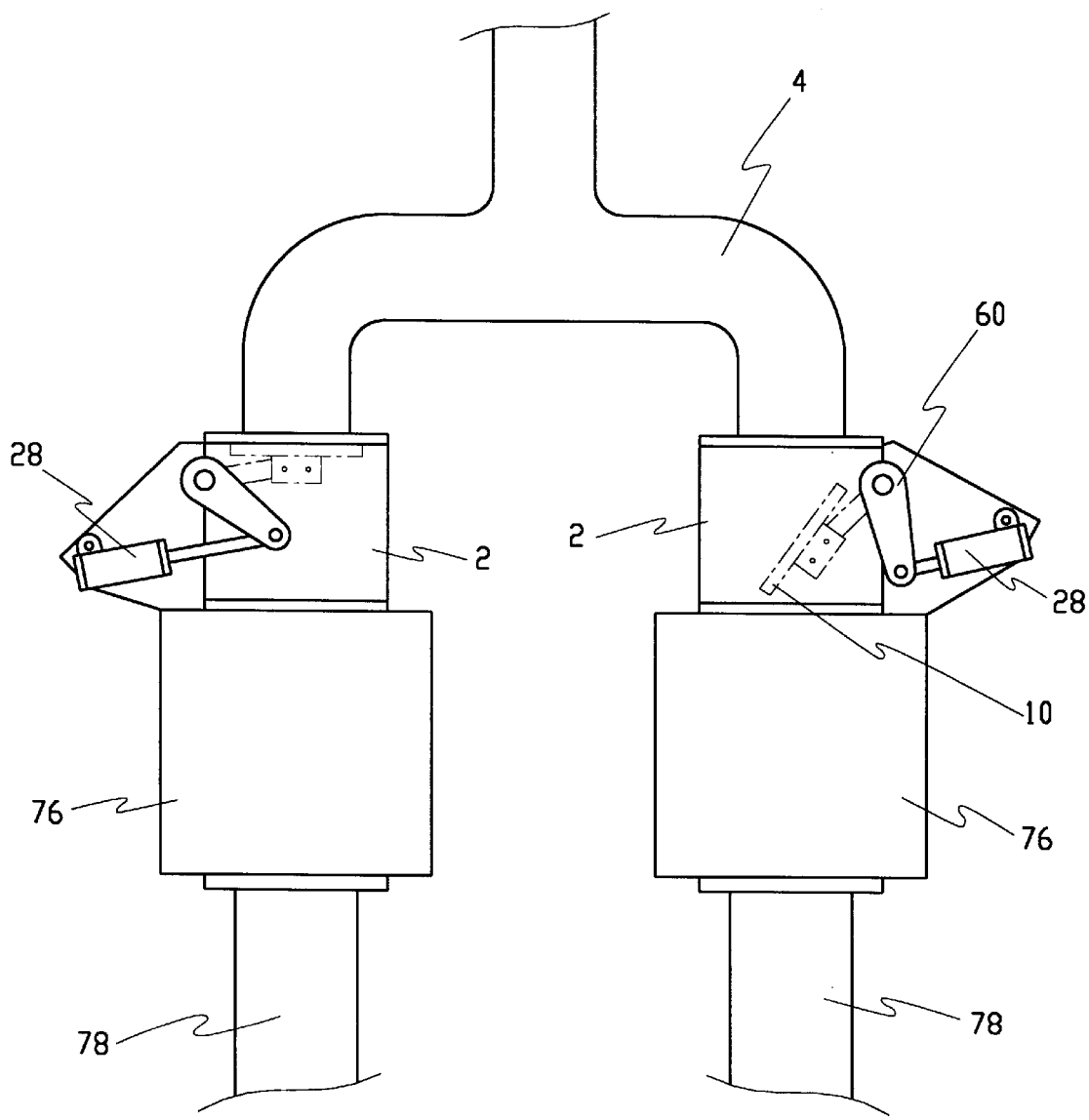
FIG. 4 is a schematic illustration of an alternate valve assembly installed in an exhaust manifold according to the present invention.

With reference to FIG. 4, the alternate valve assembly of the present invention includes a pair of valves which are symmetrically equipped in each branch of the exhaust manifold 4 split into two ways.

The valve housings 2 in which both the valves are installed, are controlled to be opened and closed alternately by the actuator 28, that is, one valve housing 2 is closed when the other valve housing 2 is opened.

The outlets 8 of the valve housings 2 are connected with filters 76. The filters 76 each include an electric heater(not shown in FIG. 4) therein and are connected with branched muffler pipes 78, respectively. Exhaust gases which are discharged through the exhaust manifold 4 pass the filter 76 via the opened valve housing 2, where the smoke particles are filtered.

The filters 76 are molded with bucket-shaped porous ceramic, whereby the filtered smoke particles are collected in the filters 76. The more the collected smoke particles are increased, the more the inner pressure of the filters 76 is increased. The inner pressure is measured by a pressure sensor and so on. The opened valve housing 2 is closed and the closed valve housing 2 is opened when the measured pressure reaches a predetermined value.

According to the above operation of the valve housings 2, exhaust gases flow into the valve housing 2 which is converted to an open state from a close state, at the same time the smoke particles which are collected in the filter 76 of the valve housing 2 converted to a close state from an open state, are re-burnt by the electric heater equipped in the filter 76. Namely, a series of operations that one filter 76 collects smoke particles while the other filter 76 re-burns the collected smoke particles are repeated, whereby the smoke particles are removed perfectly from the exhaust gases discharged through the exhaust manifold 4.

Figure 5:
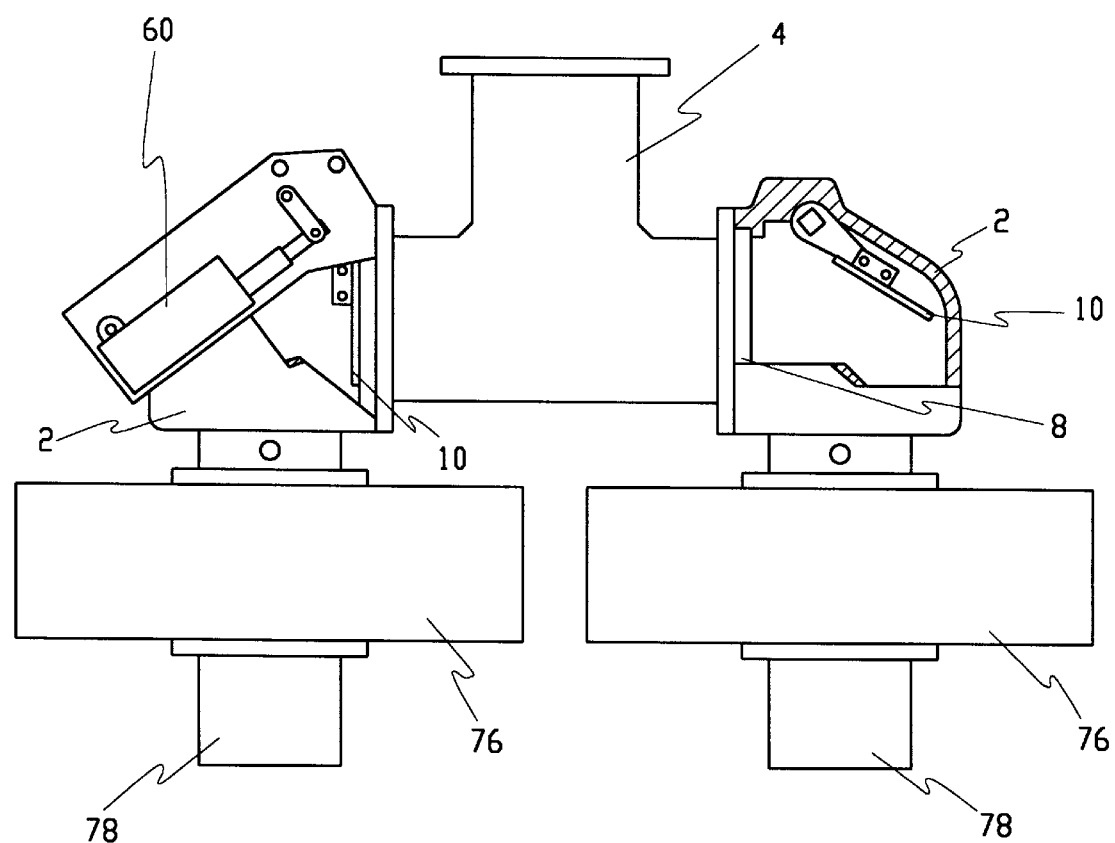
FIG. 5 is a schematic illustration of an alternate valve assembly installed in another way in an exhaust manifold according to the present invention.

FIG. 1 and FIG. 4 show that the inlet 6 and the outlet 8 of the valve housings 2 are arranged in parallel, however, the present invention is not limited to such structure. For example, as shown in FIG. 5, the alternate valve assembly may be modified into the structure that the inlet and the outlet of the valve housings 2 are arranged rectangularly, which is applied to a T-type exhaust manifold.

Figure 6:
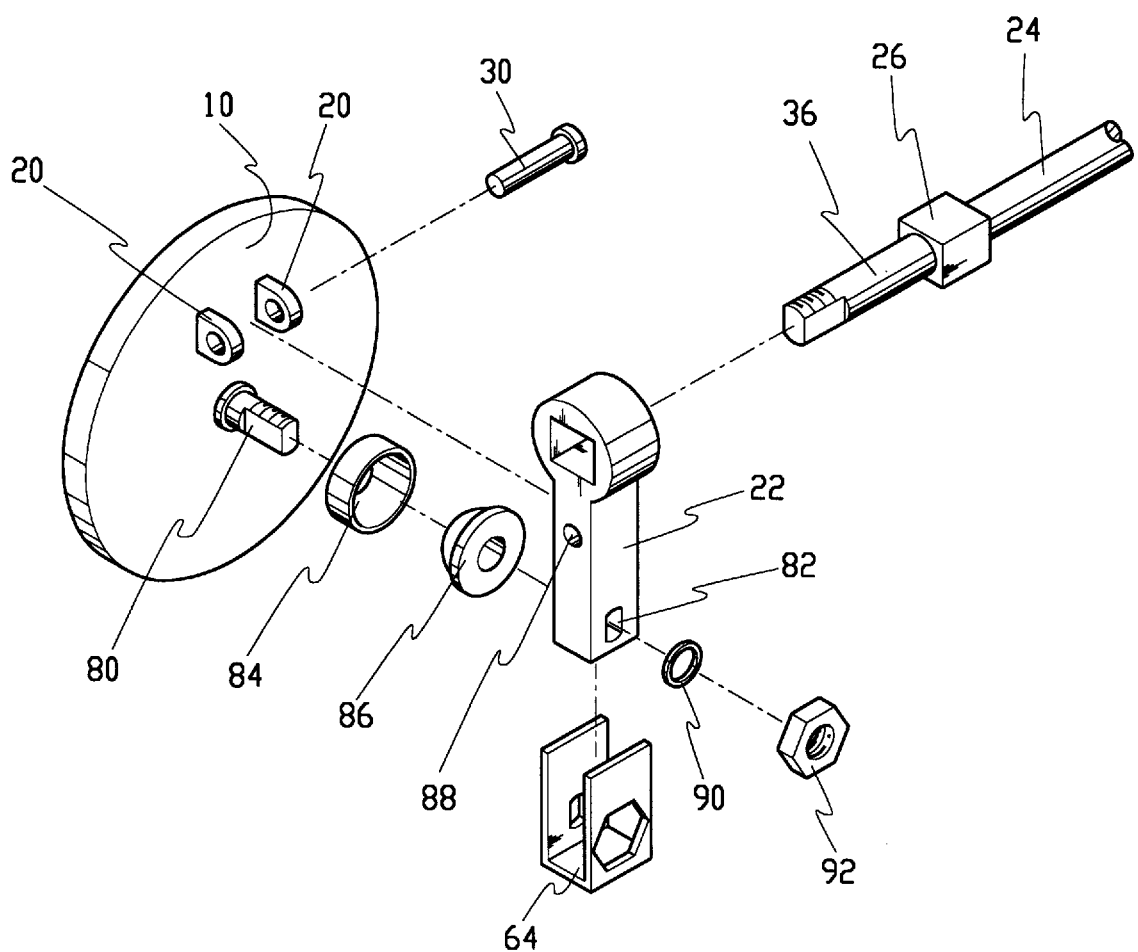
FIG. 6 is an exploded perspective view of another preferred embodiment of a valve used in a n alternate valve assembly according to the present invention.

FIG. 6 illustrates an exploded perspective view of another preferred embodiment of a valve used in an alternate valve assembly according to the present invention.

The valve body 10 includes a clamping bolt 80 and a pin bearing part 20, differently from that of FIG. 2. The arm 22 which supports the valve body 10 has a through hole 82 where said clamping bolt 80 is inserted. Said arm 22 is clamped to the clamping bolt 80 of the valve body 10 by a nut 92, and a semi sphere-shaped fluted washer 84 and a washer 86 having a semi sphere-shaped protrusion part are inserted in the clamping bolt 80, between the valve body 10 and the arm 22. Said semi sphere-shaped fluted washer 84 supports the washer 86 in a ball joint manner that the convex part of the washer 86 is fitted to the concave part of the washer 84, whereby the valve body 10 is connected with the ring-shaped valve seat 16 airtightly and uniformly. To that purpose, it is preferred that a pin hole 88 of the arm 22 which is supported to the pin bearing part 20 by the pin 30 is formed to have a considerable allowance for the pin 30.

The nut 92 is tightened to the clamping bolt 80 with a spring washer 90 interposed, so that the arm 22 is fixed to the clamping bolt 80. However, it may be desirable to equip with the jam plate 64 simultaneously to prevent the relaxation of clamping bolt 80, if necessary.

As mentioned above, in the alternate valve assembly of the present invention, both ends of the shaft 24 which is installed in the valve housing 2 are supported by the collar 50 and the bushes 44, 56, so that the valve body 10 is opened and closed smoothly.

Also, because the gap between the protruded end 36 and the bush 44 and the gap between the collar 50 and the bush 56 are closed by rings 42 and 54 and the bearing 46 of the valve housing 2 supporting the protruded end 36 is sealed up by a pair of retainer rings 66 which the packing 68 is positioned therebetween, the airtightness of the valve housing 2 can be secured and the opening and closing of the valve housing 2 may be controlled exactly.

In addition, because carbon and so on cannot be infiltrated into the gap between the shaft 24 and the bearings 46 and 48 which support the valve body 10 to be rotatable, carbon and so on are not stuck to the valve body 10.

Although the invention has been described herein on conjunction with the appended drawings, those skilled in the art will appreciate that the scope of the invention is not so limited.

What is claimed is:

1. An alternate valve assembly for a smoke re-combustion device of a engine including a pair of alternate valves which are symmetrically installed at each inlet of filters connected with branches of an exhaust manifold which is branched off two ways, each of said valves comprising:

a valve body being supported to be rotatable by a shaft in bearings of a valve housing having an inlet and an outlet, with bushes interposed, said shaft including a rectangular part about the middle of said shaft and a protruded end formed extendedly from the rectangular part, said bushes being supported in said bearings of the valve housing thereby supporting said shaft and said protruded end;

an arm connecting said valve body with said shaft;

an actuator being placed in the outside of said valve housing and being connected with said protruded end through a link thereby opening and closing said valve body through said arm alternately;

a collar being inserted in the periphery of said shaft for sealing up said shaft so that the periphery of said shaft may not be exposed to the inside of said valve housing;

rings for maintaining airtightness respectively being inserted in peripheries of said shaft and said protruded end and being pressed elastically by springs to be contacted with the inner ends of said bushes;

a pair of retainer rings being inserted in the inside of said bearing which supports said protruded end;

a packing being positioned between said retainer rings to seal up the gap between said protruded end and said bush;

a ring-shaped valve seat being inserted in and being supported by an annular groove having a jaw, said annular groove being formed in the inner periphery of said inlet of the valve housing; and a cushion being fixed to the outside of said ring-shaped valve seat to prevent exhaust gases from leaking.

2. An alternate valve assembly for the smoke re-combustion device according to claim 1, wherein said bearing of the part where the arm with which the valve body is connected is inserted and supported, is formed to a polygon shape.

3. An alternate valve assembly for the smoke re-combustion device according to claim 1, wherein said link is connected with said protruded end with a jam plate interposed.

4. An alternate valve assembly for the smoke re-combustion device according to claim 1, wherein said valve body comprises a pin bearing part and a clamping bolt in the one side of the valve body, said pin bearing part supporting both the ends of a pin which pierce a pin hole formed in the arm, said arm being fixed to said clamping bolt by interposing a semi sphere-shaped fluted washer and a washer having a semi sphere-shaped protrusion part around said clamping bolt, by inserting said clamping bolt into a through hole which is formed in the lower end of said arm, and then by clamping a nut.

* * * * *